United States Patent

[11] 3,610,695

| [72] | Inventor | Yukio Yabuta |
| | | Kanagawa, Japan |
| [21] | Appl. No. | 12,219 |
| [22] | Filed | Feb. 18, 1970 |
| [45] | Patented | Oct. 5, 1971 |
| [73] | Assignee | Fuji Photo Film Co., Ltd. |
| | | Kanagawa, Japan |
| [32] | Priority | Feb. 19, 1969 |
| [33] | | Japan |
| [31] | | 44/12,317 |

[54] ELECTROMAGNETIC-INDUCTION-TYPE NONCONTACT CONVEYING APPARATUS
3 Claims, 6 Drawing Figs.

[52] U.S. Cl............................................... 302/29, 198/41
[51] Int. Cl.................................................. B65g 53/04
[50] Field of Search............................................ 198/41; 302/29, 31

[56] References Cited
UNITED STATES PATENTS
3,469,887  9/1969  Nakahara et al..............  302/29

*Primary Examiner*—Evon C. Blunk
*Assistant Examiner*—H. S. Lane
*Attorney*—Sughrue, Rothwell, Mion, Zinn & Macpeak ABSTRACT: Paired groups of electromagnetic coils define parallel magnetic paths portions of which are selectively controlled by the object being conveyed through individual detector means above each coil group and the conveyed object which in turn rests on air film.

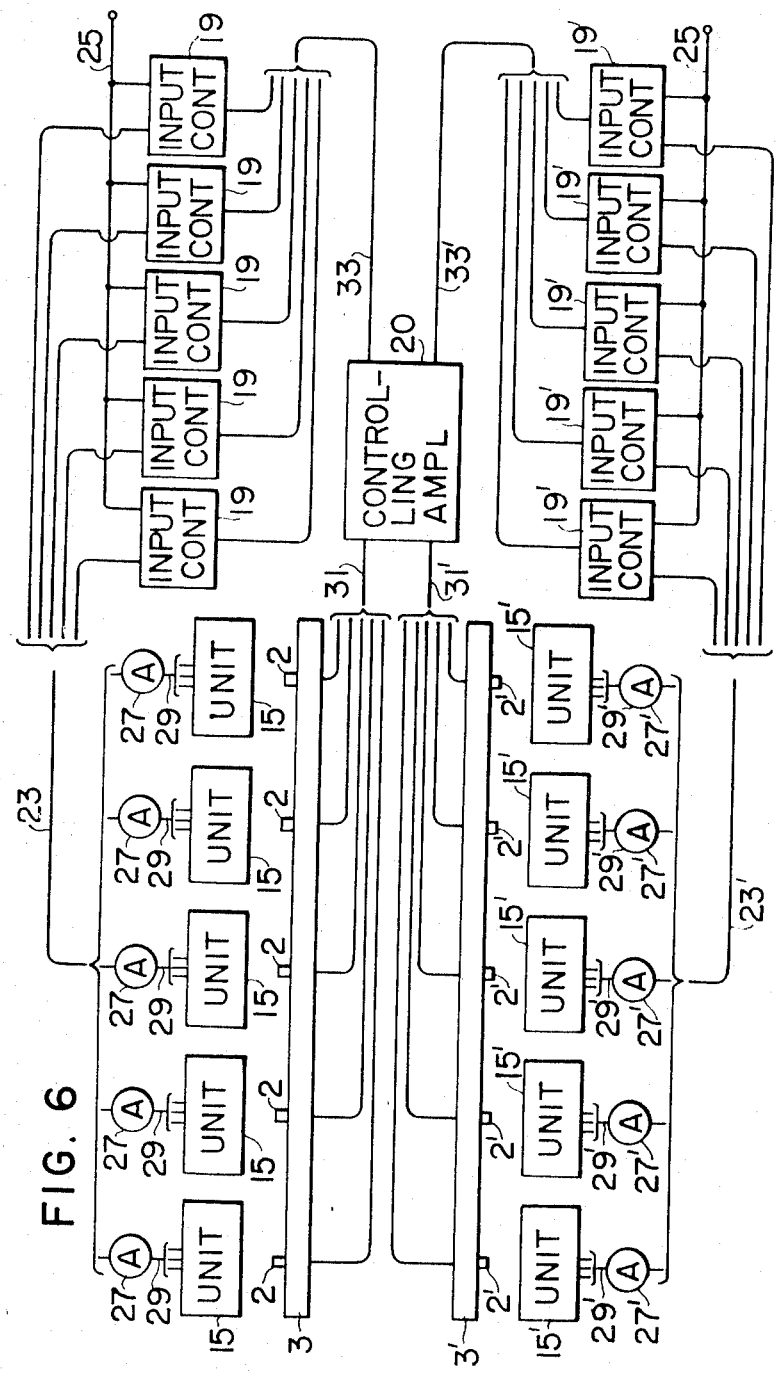

ELECTROMAGNETIC-INDUCTION-TYPE NONCONTACT CONVEYING APPARATUS

BACKGROUND OF THE INVENTION

1. Field of the Invention

This invention relates to an apparatus for conveying an object without direct contact with the object being conveyed.

2. Description of the Prior Art

Heretofore, generally in conveying objects, it has been necessary to provide an intermediate which has a contact face with mechanical friction between the driving side and the driven side or between the conveying side and the conveyed side thereof, to transmit the conveying energy from one to the other.

For example, in the conventional conveyor, the conveyed objects are in contact with the conveyor belt and the conveying energy of the prime mover is conducted to the conveyed objects by the mechanical friction existing between the conveyor belt and the object.

Take a roller conveyor, for instance. The conveyed object is subjected to the scratches on the surface thereof because the conveyed objects are all conveyed in contact with the conveying rollers.

Secondly, in order to change the conveying direction, complicated direction-changing devices have been required.

Where the object is brought into contact with the complicated direction-changing device, the object is highly liable to being scratched and a smooth change of conveying direction is difficult.

On the other hand, linear motors are well known for conveying an object linearly by electromagnetic force. The linear motor is a device equivalent to a section of a stator and a rotor of an induction motor having an infinite radius, wherein a movable member corresponding to a bearing of an induction motor is guided by a guide rail. This device is advantageous in that a linear motion can be obtained directly without utilizing any rotational movement, but it is disadvantageous in that the motion of the movable member is limited to the linear motion along the guide rail, therefore, it is very difficult to move the movable member in directions other than the direction of the guide rail. For instance, it is almost impossible to move the movable member at right angles to the guide rail or at an acute angle therewith. It is impossible to easily remove the movable member from the guide rail. Moreover, since the magnetic resistance is large in the linear motor, the efficiency is low and it requires a large amount of input current. Because it requires a large amount of current and has no cooling fan, which the general conventional motor usually has, the temperature of the coil is greatly increased and the linear motor cannot be used continuously for a long time. For example, under the conditions of voltage 110 v., frequency 50 Hz. and electric current 24 a./110 v., the standard duration time for conveying is about 40 sec.

Moreover, in the conventional conveyor, it has been very difficult to convey an object without damaging the coated surface of the object where the conveyed object is not completely dried after coating. It is very uneconomical to force the whole mechanics to work, to convey only a little object in the conventional conveyor.

SUMMARY OF THE INVENTION

In accordance with the present invention, the disadvantages, difficulties, and poor economy are eliminated. There is provided an electromagnetic-induction-type noncontact conveying apparatus which comprises a plurality of fixed coils arranged in parallel to form a shifting magnetic field. An input controller controls the input to said coils, air-injecting means makes the conveyed object hover and serves to cool the coils at the same time. Conveying-direction-detecting means are provided above the coils and the object to be conveyed, and a conveying-direction-regulating means amplifies the output signal from the conveying-direction-detecting means and delivers the output signal to the input controller to regulate the conveying direction of the object. Thus, the object is conveyed in the desired direction without the object contacting the conveying means.

The principal object of the present invention is to provide a conveying apparatus which can convey an object of metal without being in contact with the object utilizing electromagnetic force.

Another object of the present invention is to provide a conveying apparatus which does not scratch the surface of the conveyed object.

Still another object of the present invention is to provide a conveying apparatus which regulates the direction of conveying.

The fourth object of the present invention is to provide a conveying apparatus which efficiently and economically uses electric power.

The fifth object of the present invention is to provide a conveying apparatus which efficiently cools the coils employed for conveying the objects.

The sixth object of the present invention is to provide a conveying apparatus which dries the surface of the conveyed object while conveying the same.

The seventh object of the present invention is to provide a conveying apparatus which can vary the conveying speed at any position during conveying.

The eighth object of the present invention is to provide a conveying apparatus which can stop the conveyed object at any position along the conveying path and can move it again immediately when desired, and can convey the objects at very high speed.

The ninth object of the present invention is to provide a conveying apparatus which can instantly stop the conveyed object without any shock and without damaging or scratching the surface of the conveyed object even if the object has been conveyed at fairly high speed and stopped.

BRIEF DESCRIPTION OF THE DRAWINGS

FIG. 6 is a diagram showing the feedback system employed in the above embodiment of the present invention.

DESCRIPTION OF THE PREFERRED EMBODIMENT

Figure 1:
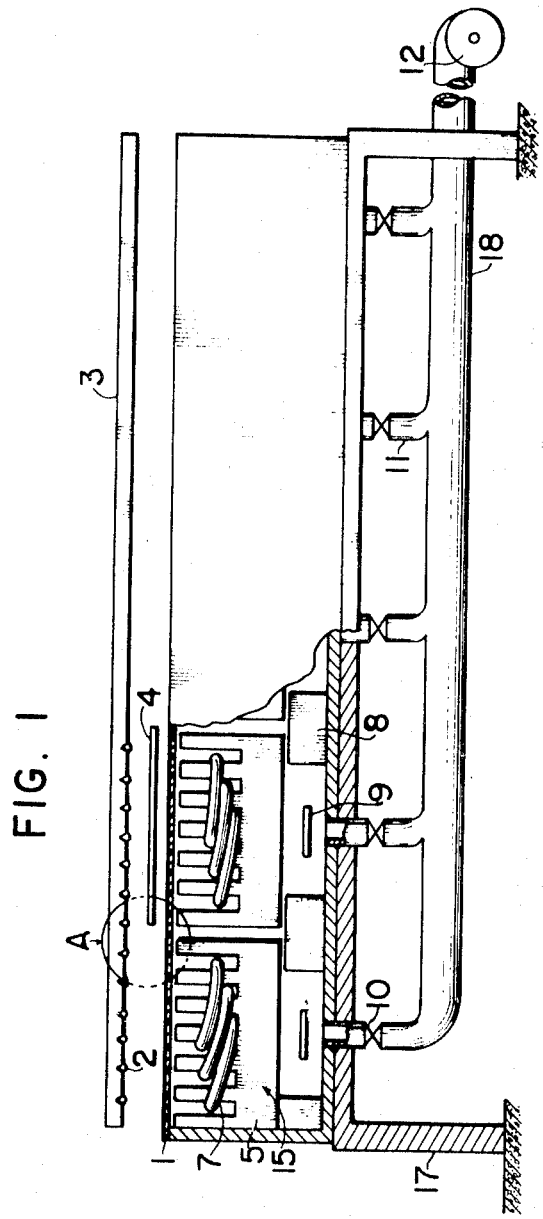
FIG. 1 is a side view partly in section of one embodiment of the conveying apparatus of the present invention.
Figure 2:
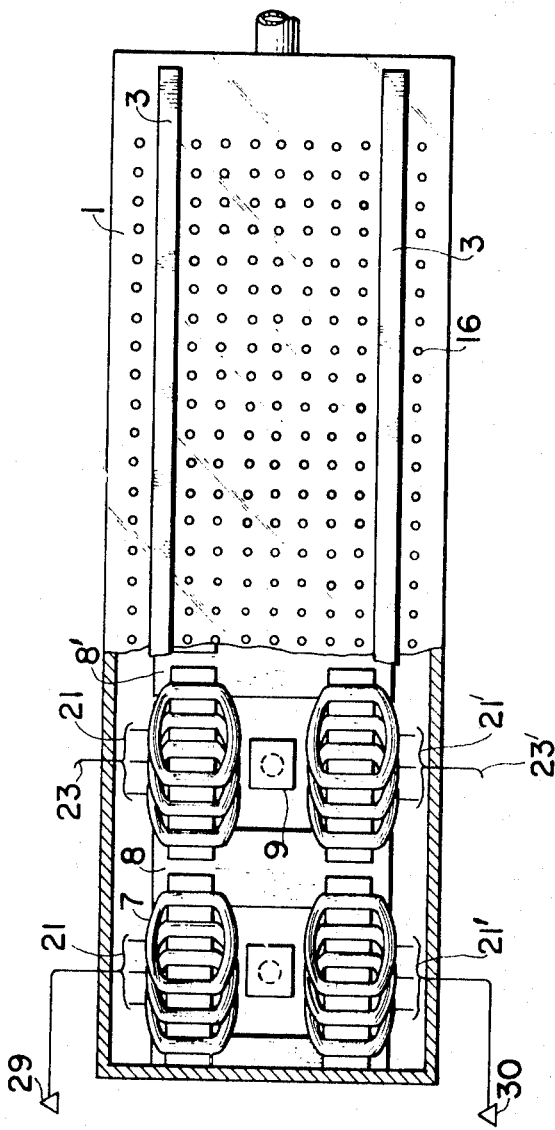
FIG. 2 is a plan view of the embodiment shown in FIG. 1.
Figure 3:
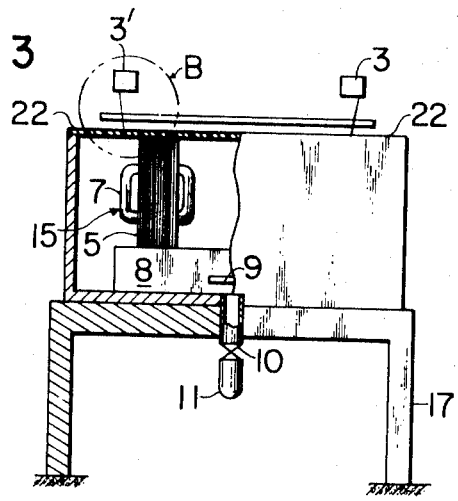
FIG. 3 is a front elevational view partly in section of the above embodiment of the present invention.
Figure 4:
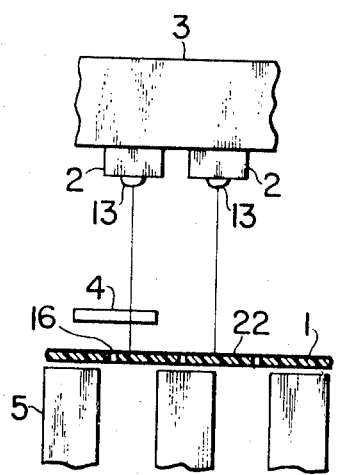
FIG. 4 is an enlarged view of the portion A of the apparatus of FIG. 1.
Figure 5:
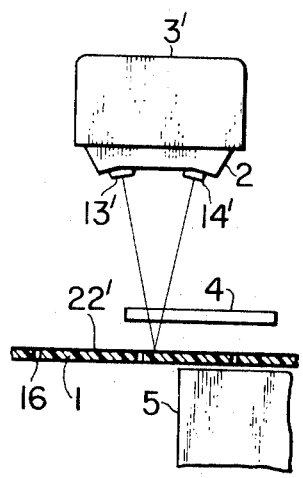
FIG. 5 is an enlarged view of the portion B of the apparatus of FIG. 3.

Now referring to the drawings, the reference numeral 5 indicates an iron core of the unit 15 of the electromagnetic induction conveying apparatus. The unit 15 is wound by a coil 7 on the grooves provided thereon. The numeral 1 indicates a nonmetal plate of heat resistance. The nonmetal plate 1 is noncombustible as well, and is provided with a number of perforations 16 of small size for injecting air therethrough to make the conveyed objects hover on an air film above the iron core 5. The reference numeral 3 indicates a conveying direction detecting device which is located above the nonmetallic plate 1 placed on the iron core 5. The conveyed object i.e. a metal plate 4 is conveyed above the nonmetallic plate 1 and below the detecting device 3. The detecting device 3 is provided with a plurality of detectors 2 to detect the position of the conveyed metal plate 4. In the embodiment of the present invention shown in the drawing, the detectors 2 are of the optical type. The detector 2 may be of any type as long as it is of the noncontact type, which detects without being in contact with the detected objects. Only magnetic detectors should be excepted from the noncontact-type detectors. The light-emitting portions 13, 13' and light-receiving portions 14, 14' are so arranged that the plane on which the portions 13, 13', 14, 14' and the reflector 22, 22' are positioned perpendicular to the conveying direction of the conveyed metallic plate 4. A baseboard 8 supports the unit 15 of iron core. An air-rectifying plate 9 is provided at the open portion of the blower duct 11 for introducing or applying an air film for making the conveyed metallic plate 4 to hover. A casing made of nonferromagnetic material is shown at 6, and a valve for controlling the airflow mounted to the duct 11 is shown at 10. The reference numeral 18 indicates a main duct of the duct 11 and is connected to an external pressure gas supplying device 12. A support 17 supports the whole apparatus for conveying objects of electromagnetic type in accordance with the present invention. Input controllers 19, 19' control the input to the unit 15, via input source terminals 25, 25' shown in FIG. 6. Leadout wires 21, 21' connect the coils 7 in the unit 15 to the input controllers 19, 19' through the lead wires 23, 23'. As for the input controllers 19, 19', saturable reactor controllers may be used for instance. The ampere meters 27, 27' are connected in the lead wires 23, 23'. The overload protection devices 29, 29' are also connected to the lead wires 23, 23'. The reference numerals 31, 31' indicate wirings for connecting the detecting devices 3, 3' to the controlling amplifier 20. Wirings 33, 33' are for connecting the controlling amplifier 20 to the input controllers 19, 19'. By those wirings, the output signal from the detecting devices 3, 3' is transmitted to the input controllers 19, 19'.

In operation, first the external air-supplying device or fan 12 is started and pressured air is supplied to the casing 6 through the duct 18, duct 11, and valve 10. The pressure air is guided or rectified by the rectifying plate 9 to efficiently cool the coils 7 wound on the iron core 5 and to make the air pressure in the casing 6 uniform. Air is injected through the small perforations 16 provided on the nonmetallic plate 1 after being rectified. The conveyed metal plate 4 hovers above the nonmetallic plate 1 under the detecting devices 3, 3', balanced with the weight thereof and the upward injection air pressure. The unit 15 of the electromagnetic induction conveying apparatus is energized through the input regulators 19, 19' and the shifting magnetic field occurs. Thus, the metallic plate 4 is moved in the direction of the shifting field by the eddy current created by the shifting field. Since the input to the fixed coils 7 is controlled as desired, the conveyed metallic plate 4 is conveyed in the desired direction. The movement or position of the conveyed metallic plate 4 is detected normally by the conveying-direction-detecting devices 3, 3' employing detectors 13, 14; 13', 14'. In the embodiment of the present invention shown in the drawings, optical detecting devices are employed and light is emitted from the light-emitting portions 13, 13' onto the mirrors 22, 22' disposed on the metallic plate 1 and after being reflected, the light is received by the light-receiving portions 14, 14' of the detecting devices. When the light is obstructed by the conveyed metallic plate 4 on the path of reflection, the obstructed signal is transmitted to the unit 15 under the conveyed metallic plate 4, through the controlling amplifier 20 and the input controllers 19, 19'. Then, the unit 15 provides a shifting magnetic field to convey the metallic plate 4 further. The metallic plate 4 is conveyed by the electromagnetic force generated by the eddy current and shifting magnetic field. By electromagnetic force, the metallic plate 4 is conveyed to the next pair of detectors. When the next detectors detect the coming of the conveyed object, the unit 15 under the object is provided with the electromagnetic induction means to further convey the object to the next succeeding detectors. Thus, the object is continuously conveyed in one direction along the sequential arrangement of the units of iron cores 5. After the object passes away and when the light from the light-emitting portion is received by the light-receiving portion of the detectors, the signal informing the passing of the object is transmitted to the controlling amplifier 20 and the input into the unit 15 is terminated. Where the practical conveying direction of the object is not coincident with the desired direction, detector 2 and the detector 2', for instance, do not detect the coming of the object at the same time. In such a case, the input to the unit on the side where the obstruction of the light of the detector occurs later, is more largely amplified in order to give a larger force to the side displaced outward from the desired position to convey the metallic plate 4 in the desired direction.

If the metallic plate to be conveyed has sufficient reflectance to reflect the light from the light-emitting portion of the detector into the light-receiving portion thereof, the conveying direction can be controlled by utilizing the reflectivity of the conveyed metallic plate 4. In such a case, there is no need to dispose mirrors 22, 22' on the nonmetallic plate 1 to reflect the light from the light-emitting portion of the detector.

Since the conveying apparatus in accordance with the present invention is constructed as described above, there is many advantages to accomplish the objects of the present invention as enumerated at the beginning of this specification.

The principal object of the present invention can be completely fulfilled and the metallic plate can be conveyed without being in contact with any conveying means of the apparatus since there is no need to provide any contact surface to transmit the conveying energy from the apparatus to the conveyed object because the object is conveyed by means of electromagnetic force.

Another object of the present invention is naturally fulfilled by accomplishment of the principal object of the invention. Since the conveyed object is conveyed without being in contact with the conveying apparatus or any other solid portions, there is no fear of damaging or scratching the surface of the conveyed object.

Still another object of the present invention is easily fulfilled. The conveying direction can be easily regulated or amended since the conveying direction is normally detected and the detected information is fed back to the controller to regulate the conveying direction.

The fourth object of the present invention is fulfilled also by the electrical arrangement. Since the conveying position is detected by detectors and the detected signal is fed back to further convey the object, only to the unit where the conveyed object is positioned, the electric power is utilized very economically.

The fifth object of the present invention is fulfilled since the injected air for making the conveyed plate hover above the unit is utilized for cooling the unit at the same time.

At the same time, by the injected air the conveyed plate can be dried. Thus, the sixth object of the present invention can be fulfilled.

The seventh object of the present invention is fulfilled by controlling the input controller partly at the desired time.

By controlling the input controller, the conveyed object can be stopped or started an instance. And since the conveyed object is not moved by inertia, the object can be conveyed at a great speed. Thus, the eighth object is fulfilled.

The ninth object is fulfilled easily, since the unit can be provided with a reverse electrical input to convey it in the reverse direction to cause a sudden stop of the object without damaging the object.

What is claimed is:

1. An electromagnetic-induction-type conveying apparatus which comprises: a plurality of fixed coils arranged in sequence to make a shifting magnetic field, an input controller to control the input into said coils, means for creating an air film to cause conveyed objects to hover above said coils, means disposed above said coils and conveyed objects for detecting the conveying direction, and means for regulating the conveying direction by amplifying the output signal from said detecting means and delivering the output signal to said controller.

2. The conveying apparatus as claimed in claim 1 wherein said means for creating said air film includes means for first passing said air over said coils to cool the same.

3. The conveying apparatus as claimed in claim 1 wherein plural arrays of coils are provided along parallel paths, independent detectors are associated with each coil array and means responsive to the time of energization of said detectors for variably controlling energization of associated parallel coil arrays to orient the metal object being conveyed thereby.